United States Patent
Miller et al.

(10) Patent No.: US 7,093,956 B2
(45) Date of Patent: Aug. 22, 2006

(54) METHOD OF LIGHTING FOR PROTECTING SEA TURTLES

(75) Inventors: David C. Miller, Tampa, FL (US); Eric Bretschneider, Tampa, FL (US)

(73) Assignee: Beeman Holdings, Inc., Sarasota, FL (US)

( * ) Notice: Subject to any disclaimer, the term of this patent is extended or adjusted under 35 U.S.C. 154(b) by 0 days.

(21) Appl. No.: 11/040,523

(22) Filed: Jan. 20, 2005

(65) Prior Publication Data

US 2005/0168982 A1 Aug. 4, 2005

Related U.S. Application Data

(60) Provisional application No. 60/538,652, filed on Jan. 23, 2004.

(51) Int. Cl.
*F21V 9/08* (2006.01)
(52) U.S. Cl. .................. 362/231; 362/13; 362/230; 362/800; 119/200
(58) Field of Classification Search ............... 362/231, 362/3, 11, 13, 227, 228, 230, 800; 40/541, 40/581; 116/200, 202; 43/17.5; 119/200, 119/219, 233, 266, 267
See application file for complete search history.

(56) References Cited

U.S. PATENT DOCUMENTS

| 4,329,737 | A | * | 5/1982 | Triller et al. ................. 362/231 |
| 4,947,291 | A | * | 8/1990 | McDermott .................. 362/231 |
| 5,685,637 | A | * | 11/1997 | Chapman et al. ........... 362/228 |
| 6,095,661 | A | * | 8/2000 | Lebens et al. .............. 362/184 |
| 6,471,369 | B1 | * | 10/2002 | Valella, Jr. .................. 362/230 |

OTHER PUBLICATIONS

Turtle Alert!—High powered lamps scare turtles away from the beaches, 1997, World Society for the Protection of Animals, http://tofino.ex.ac.uk/euroturtle/talert/page5.htm.*
American City & County, Project tests turtle-friendly roadway lighting, Oct. 1, 2001, Primedia Business Magazine and Media Inc., http://www.americancityandcounty.com/mag/government_project_tests_turtlefriendly/.*
FPL, Reducing the impact of artificial light on sea turtles, Dec. 13, 2003, Florida Power and Light, http://fpl.com/environment/endangered/contents/reducing_the_impact_of_artificial_light_on_sea_turtles.shtml.*

* cited by examiner

*Primary Examiner*—Sandra O'Shea
*Assistant Examiner*—Ismael Negron
(74) *Attorney, Agent, or Firm*—Fish & Richardson P.C.

(57) ABSTRACT

A method of lighting to protect sea turtles comprises providing in a housing both a white light source, for example a low-voltage incandescent source, and a red LED source that is visible to humans but that does not interfere with the normal nesting and hatching behavior of sea turtles, and selectively energizing the latter source during turtle nesting season.

5 Claims, 2 Drawing Sheets

METHOD OF LIGHTING FOR PROTECTING SEA TURTLES

This application claims the benefit of prior U.S. provisional application No. 60/538,652, filed Jan. 23, 2004.

TECHNICAL FIELD

This invention relates to lighting and lighting fixtures, and more particularly to outdoor lighting, which may be seen by animals.

BACKGROUND

Eight out of twelve species of sea turtle are on the endangered species list. A large part of the problem is that the hatchlings crawl toward lights along the beach instead of toward the moonlight reflecting off of the water and are killed. Lights may also discourage female turtles from coming ashore to nest.

Turtle nesting season runs from March 1 to November 1. Florida has mandated that beachfront illumination must be turned off or blacked out during this period. This presents a potential hazard for pedestrians negotiating dark walkways. There is gathering evidence that turtles cannot see red and/or yellow wavelengths well. The present application uses LEDs of such peak wavelengths, preferably red LEDs, as Turtle Friendly Lights. In an implementation, a light also may use an incandescent or fluorescent white light and red LEDs with the same power source switchable between emitting white light and red light.

Due to the nature of color vision, monochromatic red light may be used. Filtered (incandescent) white lights may look red to humans while still emitting a significant portion of yellow, green and even blue light. These shorter wavelengths of light do not significantly impact the perception of red color to humans, but may still be visible to turtles.

Low-pressure sodium vapor lamps emit nearly monochromatic yellow light that has been shown not to interfere with the nesting behavior of some species of turtles. This color may be unappealing and can exhibit poor color rendering properties. Due to their size, power supply requirements and expense, it is difficult to integrate these lamps with another more traditional light source to provide flexible and appropriate landscape and decorative lighting. The low-pressure sodium lamps are more suited to area illumination of parking lots and highway interchanges.

Traditional landscape lighting uses incandescent or fluorescent lighting fixtures. Both of these light sources emit significant amounts of light at wavelengths less than 570 nm, which has proven to be disorienting to both nesting adult turtles and hatchlings. While these light sources could be rendered more ecologically compatible in turtle nesting areas by use of filters, significant labor is required to install and uninstall these filters at the beginning and end of turtle nesting season. Further, high quality filters that block all light emission at wavelengths below 570 nm and will not degrade in the temperatures and humidity typical of turtle nesting beaches are expensive and are not available in useful shapes. Therefore, filtering will be an expensive and inconvenient solution.

SUMMARY OF THE INVENTION

The present disclosure provides methods and techniques for protecting wildlife. The techniques provide for lighting that may be switched between light sources. One light source can emit white light, which contains wavelengths of light that are visible to a particular animal species, and another light source can and does emit a substantially monochromatic wavelength that is not visible to the particular species. Both light sources can be visible to humans and provide lighting for ornamental, functional, safety and other uses.

In one aspect, the techniques include providing an incandescent light source in a housing; providing light emitting diode light sources in the housing, all of the diodes emitting a substantially monochromatic wavelength of light; energizing either the light emitting diode light sources or incandescent light sources, wherein the light emitted from the light emitting diode light sources is not visible to a selected species of animal.

The details of one or more embodiments of the invention are set forth in the accompanying drawings and the description below. Other features, objects, and advantages of the invention will be apparent from the description and drawings, and from the claims.

DETAILED DESCRIPTION

The present disclosure provides resorts, public parks as well as homeowners with an aesthetically pleasing landscape light that is ecologically compatible and that will not interfere with the normal nest and hatching behavior of sea turtles.

The present invention provides lighting fixtures that may be switched from white light to a monochromatic light that is not visible to a selected animal species. The white light can be from any source, including incandescent, fluorescent and LED. If the white source is one or more LED's, simple switching between white and monochromatic LED's is all that is required. Otherwise differences on operating voltages must be taken into account, as will be explained utilizing incandescent lighting as the source of white light. Incandescent landscape lights may be designed to operate at voltages between 12 and 18 volts. Although the red LEDs that are most compatible for use in turtle nesting areas operate at approximately 2 volts, operating multiple LEDs in a series of 6 to 9 devices results in a fixture that can operate at the same voltages as incandescent lights. The use of monochromatic red LEDs for landscape lighting may not be aesthetically pleasing. Alternatively, neon bulbs may be used to radiate a red light that is not visible to sea turtles.

The monochromatic LEDs may have a peak wavelength greater than 590 nanometers (nm), preferably in the range of 590–650 nm, more preferably 630–650 nm, and most preferably 640–650 nm.

A preferred configuration of the device is a fixture that comprises an incandescent or fluorescent light, one or more strings of red (or possibly yellow) LEDs connected in series and a voltage sensing circuit that can switch the current between the incandescent light or the LEDs depending on the line voltage. A simple switch located at the transformer providing the power to the light fixtures allows step changes in the operating voltage that can be used to switch between operating modes. This system allows for owners to choose between operating lighting fixtures with either a broadspectrum white light or a nearly monochromatic red LED without the need for installation and removal of filters or changing light bulbs.

Incandescent lights are typically operated using AC power supplies, while LEDs are typically operated using a DC power supply. This dichotomy can be resolved by using a simple rectifier circuit for the LEDs or by using pairs of LED strings set in parallel, but with opposite polarity.

A variety of commonly known circuit designs exist that can allow easy switching between incandescent and LED operation. Such switching could be accomplished by means of a mechanical switch, input voltage, or a control signal in an RS-232, RS-485 or other electronic control system.

Figure 1:
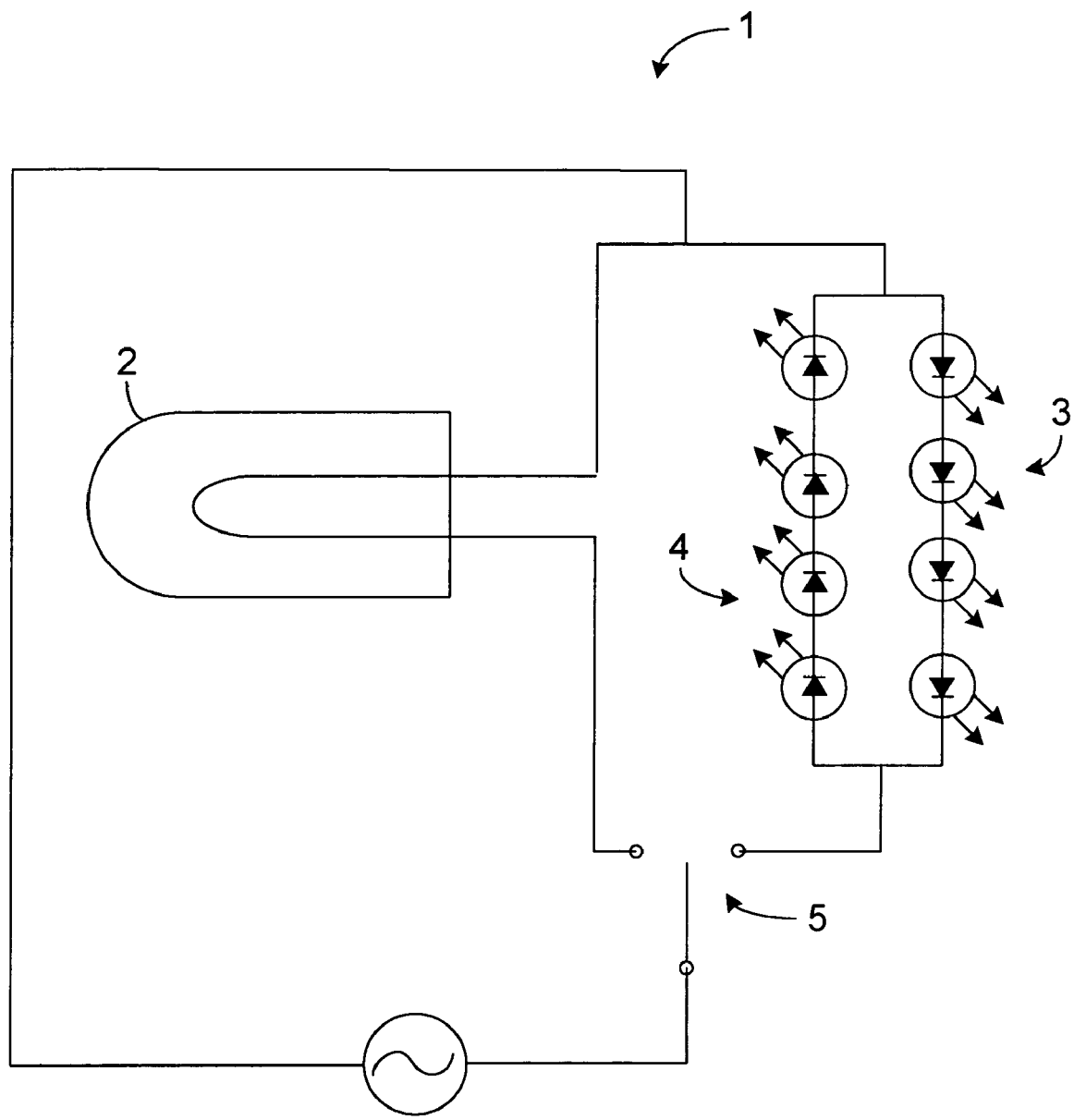
FIG. 1 is a diagram of one embodiment of a lighting circuit according to this invention.

FIG. 1 presents a circuit 1 that may be utilized in this invention. It shows an incandescent light source 2, strings 3, 4 of monochromatic LED's, and a switch 5 for switching between source 2 and strings 3, 4. Arrows on the LED's show polarity. Multiple strings of each polarity may also be used.

Figure 2:
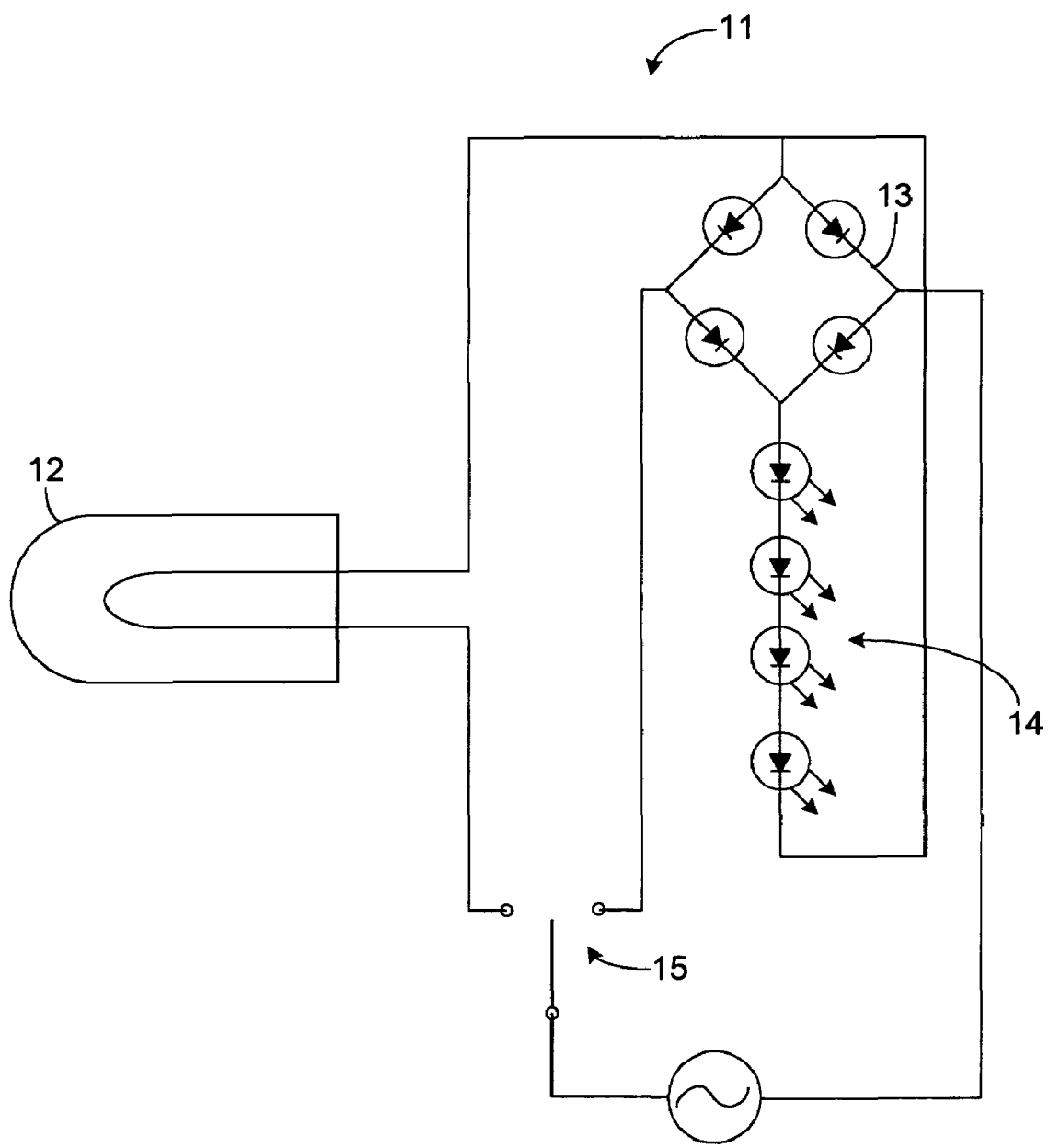
FIG. 2 is a diagram of another embodiment of a lighting circuit according to this invention.

FIG. 2 presents another circuit 11 that may be utilized in this invention. It shows an incandescent light 12, a string 14 of monochromatic LED's, and rectifier 13 in the LED circuit, and switch 15 for switching between source 12 and rectifier 13 and LED string 14. Multiple strings of LEDs in parallel may also be used.

A number of embodiments of the invention have been described. Nevertheless, it will be understood that various modifications may be made without departing from the spirit and scope of the invention. For example, all-LED or fluorescent-LED circuits may be utilized. Accordingly, other embodiments are within the scope of the following claims.

What is claimed is:

1. A method of lighting for protecting sea turtles comprising providing a housing containing first and second selectively operable low-voltage light sources and switch means for selectively energizing either light source, wherein the first low-voltage light source is a source of white light that is usefully visible to humans but interferes with the normal nesting and hatching of sea turtles, and wherein the second low-voltage light source is an LED source that is usefully visible to humans but does not interfere with the normal nesting and hatching of sea turtles, that has a peak wavelength greater than 590 nm but not greater than 650 nm, and that comprises at least one string of from six to nine LED's in series, and selectively energizing the second light source rather than the first light source during turtle nesting season.

2. The method of claim 1 wherein the second light source comprises a pair of LED strings set in parallel but with opposite polarity.

3. The method of claim 1 wherein the second light source has a peak wavelength in the range of 630–650 nm.

4. The method of claim 1 further comprising a rectifier in the circuit of the second light source.

5. The method of claim 1 wherein the first light source is an incandescent light source.

* * * * *